United States Patent
Kosecoff

(10) Patent No.: US 11,405,184 B2
(45) Date of Patent: Aug. 2, 2022

(54) SYSTEMS AND METHODS FOR SECURELY PROCESSING ENVIRONMENTAL EXPOSURE INFORMATION

(71) Applicant: L'Oreal, Paris (FR)

(72) Inventor: David Kosecoff, San Francisco, CA (US)

(73) Assignee: L'Oreal, Paris (FR)

(*) Notice: Subject to any disclaimer, the term of this patent is extended or adjusted under 35 U.S.C. 154(b) by 10 days.

(21) Appl. No.: 16/991,792

(22) Filed: Aug. 12, 2020

(65) Prior Publication Data
US 2022/0052836 A1 Feb. 17, 2022

(51) Int. Cl.
- H04L 29/06 (2006.01)
- H04L 9/06 (2006.01)
- H04L 9/32 (2006.01)
- G06F 21/60 (2013.01)

(52) U.S. Cl.
CPC .......... H04L 9/0637 (2013.01); G06F 21/602 (2013.01); H04L 9/3218 (2013.01); H04L 9/3268 (2013.01); H04L 2209/38 (2013.01)

(58) Field of Classification Search
CPC ... H04L 9/0637; H04L 9/3218; H04L 9/3268; H04L 2209/38; G06F 21/602
See application file for complete search history.

(56) References Cited

U.S. PATENT DOCUMENTS

| | | | |
|---|---|---|---|
| 9,614,673 B2* | 4/2017 | Kim | H04L 9/0863 |
| 10,678,944 B2 | 6/2020 | Khi et al. | |
| 10,693,632 B1 | 6/2020 | Winklevoss et al. | |
| 10,742,424 B2 | 8/2020 | Redpath et al. | |
| 11,088,830 B2* | 8/2021 | Gu | G06Q 10/08 |
| 11,163,282 B2* | 11/2021 | Cella | G05B 19/0425 |
| 2007/0095905 A1* | 5/2007 | Kadaba | G06F 17/00 235/375 |
| 2008/0039052 A1* | 2/2008 | Knowles | H04L 51/38 455/412.1 |
| 2008/0112355 A1* | 5/2008 | Krishnakumar | H04W 84/22 370/328 |

(Continued)

FOREIGN PATENT DOCUMENTS

| | | | |
|---|---|---|---|
| JP | 2011160327 A | * | 8/2011 |
| WO | 2018/211691 A1 | | 11/2019 |
| WO | 2020/060606 A1 | | 3/2020 |

OTHER PUBLICATIONS

Search Report and Written Opinion dated Jun. 22, 2021, issued in corresponding French Application No. FR 2010302, 7 pages.

*Primary Examiner* — Darshan I Dhruv
(74) *Attorney, Agent, or Firm* — Christensen O'Connor Johnson Kindness PLLC

(57) ABSTRACT

A wearable computing device is provided that comprises one or more environmental sensors, one or more positioning sensors, and a communication interface. In some embodiments, the wearable computing device is configured to activate at least one environmental sensor of the one or more environmental sensors to obtain at least one environmental condition value; activate at least one positioning sensor of the one or more positioning sensors to determine a position of the wearable computing device; activate the communication interface; and transmit the at least one environmental condition value and the position for storage in a blockchain storage system.

18 Claims, 5 Drawing Sheets

(56) References Cited

U.S. PATENT DOCUMENTS

| | | | |
|---|---|---|---|
| 2011/0069699 A1* | 3/2011 | Balasaygun | H04M 1/2535 |
| | | | 370/352 |
| 2019/0165949 A1* | 5/2019 | Ramos | H04L 9/3239 |
| 2019/0187649 A1* | 6/2019 | Cella | G06F 3/0488 |
| 2019/0189259 A1 | 6/2019 | Clark | |
| 2019/0311443 A1* | 10/2019 | Blades | G06Q 40/12 |
| 2020/0004999 A1* | 1/2020 | Kawaguchi | H04W 4/80 |
| 2020/0027026 A1 | 1/2020 | Cook et al. | |
| 2020/0287775 A1 | 9/2020 | Khasis | |
| 2020/0372498 A1* | 11/2020 | Chen | H04L 9/3239 |
| 2020/0404483 A1* | 12/2020 | Qiang | H04W 12/08 |
| 2021/0144158 A1* | 5/2021 | Gerards | G16Y 20/20 |
| 2021/0248330 A1* | 8/2021 | Kawaguchi | H04W 4/80 |
| 2021/0263909 A1* | 8/2021 | Paracha | G06F 11/0727 |
| 2021/0336775 A1* | 10/2021 | Gu | G06Q 10/0832 |

\* cited by examiner

SYSTEMS AND METHODS FOR SECURELY PROCESSING ENVIRONMENTAL EXPOSURE INFORMATION

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a wearable computing device is provided. The wearable computing device comprises one or more environmental sensors; one or more positioning sensors; and a communication interface. The wearable computing device is configured to activate at least one environmental sensor of the one or more environmental sensors to obtain at least one environmental condition value; activate at least one positioning sensor of the one or more positioning sensors to determine a position of the wearable computing device; activate the communication interface; and transmit the at least one environmental condition value and the position for storage in a blockchain storage system.

In some embodiments, a system is provided. The system comprises a blockchain storage system, a communication device, and a wearable computing device. The blockchain storage system includes a plurality of computing devices configured to collectively store information. The wearable computing device includes at least one processor, at least one environmental sensor, at least one positioning sensor, and a computer-readable medium having computer-executable instructions stored thereon. The instructions, in response to execution by the at least one processor, cause the wearable computing device to perform actions comprising: activating a first environmental sensor of the at least one environmental sensor to obtain at least one environmental condition value; activating the at least one positioning sensor to determine a position of the wearable computing device; and transmitting the at least one environmental condition value and the position to the communication device for storage in the blockchain storage system.

In some embodiments, a wearable computing device. The wearable computing device comprises circuitry for activating at least one environmental sensor of the wearable computing device to obtain at least one environmental condition value; circuitry for activating at least one positioning sensor of the wearable computing device to determine a position of the wearable computing device; circuitry for activating a communication interface of the wearable computing device; and circuitry for transmitting the at least one environmental condition value and the position for storage in a blockchain storage system.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Gathering information about exposure to environmental pollutants is increasingly important for multiple reasons. For example, in many cases, it is in the interest of employers to know how the people they are held responsible for are being affected. As another example, it is in the interest of governmental entities to be able to monitor locations for compliance with environmental regulations and to identify areas that are not in compliance. As yet another example, individuals may desire information regarding exposure to environmental pollutants in order to take steps to mitigate the effects of such exposure, including but not limited to avoiding further exposure and using products such as skincare products that can reduce the harmful effects of the exposures.

That said, multiple problems exist with regard to collecting environmental pollutant exposure information. It is often not within the financial or organizational ability of governmental organizations to deploy networks of environmental pollutant sensors over wide geographical areas, particularly to obtain fine-grained information about pollutant levels in particular areas. Further, organizations are unlikely to be willing to freely share information for which significant capital investments are required to gather. Also, problems exist with regard to the reliability of data collected from sensor networks in which multiple entities control the actual sensors: if a property owner deploys sensors and is responsible for collecting and reporting data from the sensors to a monitoring entity, there is an incentive for the property owner to manipulate the data to ensure that it does not report violations of environmental regulations on the part of the property owner. What is desired are systems and techniques for gathering environmental condition information from a distributed network of sensors that can provide verification that the information has not been manipulated after being generated by the sensors.

Figure 1:
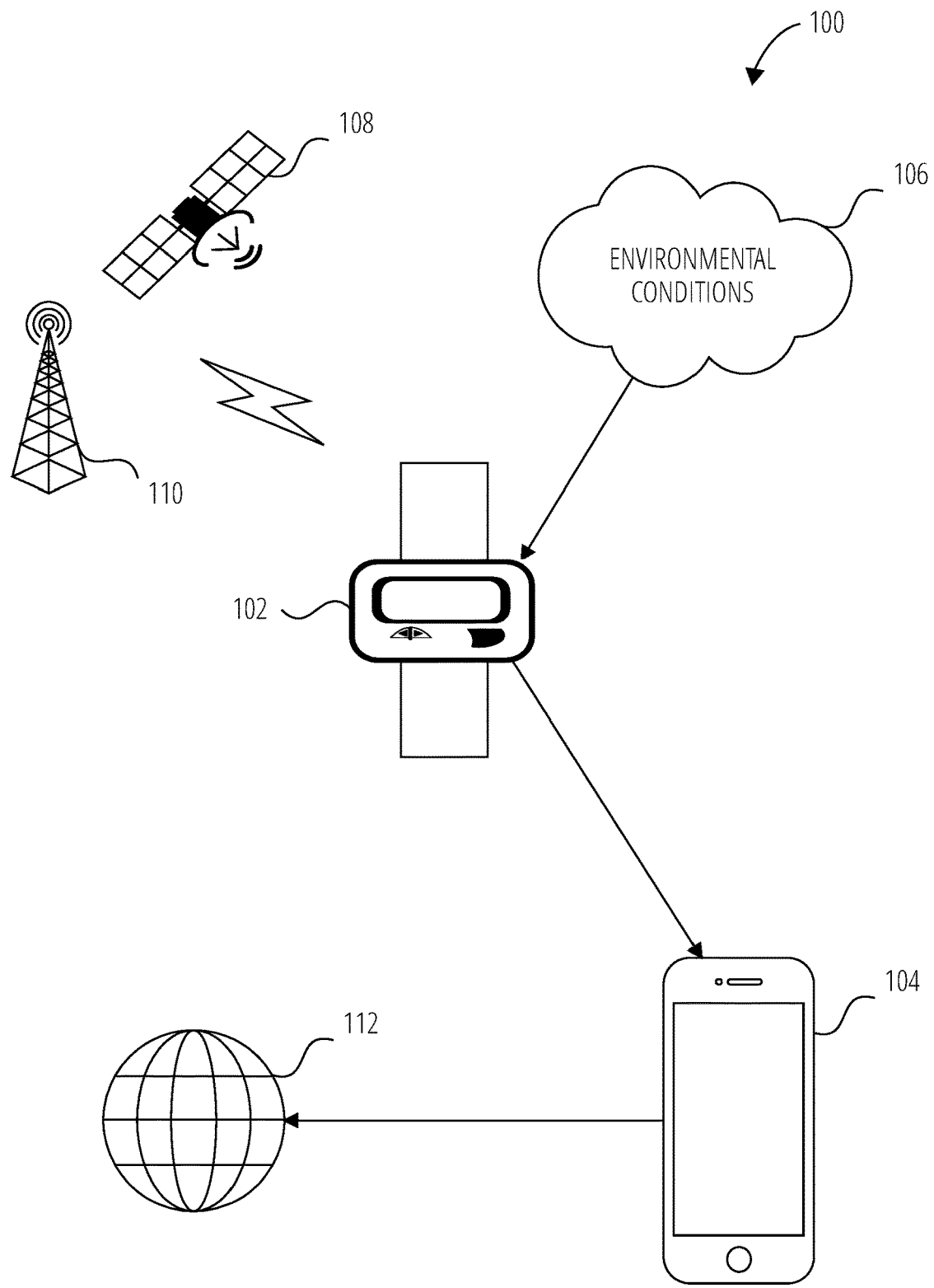
FIG. 1 is a schematic diagram that illustrates a non-limiting example embodiment of a system for securely collecting environmental condition information according to various aspects of the present disclosure.

FIG. 1 is a schematic diagram that illustrates a non-limiting example embodiment of a system for securely collecting environmental condition information according to various aspects of the present disclosure. As shown, the system 100 includes a wearable computing device 102. In many embodiments, a plurality of wearable computing devices 102 are included in the system 100, and are worn by a plurality of users across one or more geographic areas or within one or more enclosed spaces such as buildings. In some embodiments, the wearable computing device 102 has a strap and is mounted to a wrist of a user, similar to a watch. In some embodiments, the wearable computing device 102 is a fob, ID tag, pin, zipper pull, or other form factor that a user may wear as a necklace or attached to clothing. In some embodiments, the wearable computing device 102 may be in a form factor designed to be carried rather than worn by the user, such as a case for a mobile phone, an attachment for a backpack or briefcase.

The wearable computing device 102 includes one or more sensors that are configured to sense one or more environmental conditions 106. The environmental conditions 106 are discussed further below, and may include but are not limited to levels of environmental pollutants, temperatures, humidity levels, ambient pressures, UV exposures, or any other suitable environmental condition.

The wearable computing device 102 also includes one or more sensors that are configured to sense a position of the wearable computing device 102. In some embodiments, the sensors may detect signals generated by a global navigation satellite system 108 including but not limited to GPS, GLONASS, and Galileo. In some embodiments, the sensors may detect signals generated by a local positioning system 110 including but not limited to cellular base stations, Wi-Fi access points, radio broadcast towers, and LORAN. In some embodiments, the sensors of the wearable computing device 102 may use signals from more than one positioning system in order to improve accuracy of the detected position.

In some embodiments, the wearable computing device 102 correlates the detected position with the detected environmental conditions 106, and reports combinations of positions and environmental conditions to a communication device 104. In some embodiments, the communication device 104 may be a smartphone or other mobile computing device that allows both short-range communication with the wearable computing device 102 and long-range communication with the blockchain storage system 112. However, this example should not be seen as limiting, and any other suitable computing device, including but not limited to a desktop computing device, a laptop computing device, or a tablet computing device, may be used as the communication device 104.

The wearable computing device 102 and the communication device 104 may communicate using any suitable communication technology, including but not limited to wireless technologies such as Bluetooth, 2G, 3G, 4G, 5G, LTE, Wi-Fi, WiMAX, and infrared; wired technologies such as USB, Ethernet, FireWire, and Lightning; or combinations thereof. The communication between the wearable computing device 102 and the communication device 104 is typically a low-powered communication in order to reduce battery consumption on both the wearable computing device 102 and the communication device 104. In some embodiments, the communication device 104 may also include sensors capable of detecting position of the communication device 104, and a position of the communication device 104 may be used as a proxy for the position of the wearable computing device 102.

In some embodiments, after receiving the position and environmental condition information from the wearable computing device 102, the communication device 104 transmits the position and environmental condition information for storage in a blockchain storage system 112 (see e.g., U.S. Pat. Nos. 10,742,424, 10,693,632, and 10,678,944; each incorporated herein by reference in their entirety). In some embodiments, the blockchain storage system 112 is a distributed system of multiple computing devices that collectively store and manage information in a cryptographically secure data structure, including but not limited to a Merkle tree, and that collectively work to add new information to the data structure using a proof-of-work technique, a proof-of-stake technique, a proof-of-space technique, a proof-of-authority technique, or any other suitable technique. In some embodiments, the communication device 104 and/or the wearable computing device 102 may participate as part of the blockchain storage system 112.

In some embodiments, the wearable computing device 102 and/or the communication device 104 may apply cryptographic signatures to the collected position and environmental condition information before transmitting the collected information to other devices. In such embodiments, a secure chain of custody from the signing device(s) to the blockchain storage system 112 can be established, thus increasing the likelihood that not only has the information not been tampered with after being stored in the blockchain storage system 112, but also increasing the likelihood that the collected information was genuinely collected at the position asserted. Using such techniques, a system of distributed wearable computing devices 102 and communication devices 104 that are not under the control of fully trusted users can still be used to collect and store reliable data in the blockchain storage system 112.

In some embodiments, participation in the blockchain storage system 112 may be incentivized using any suitable technique. For example, users may be incentivized to provide computing resources for the blockchain storage system 112 from their communication device 104 (or from other computing devices controlled by the users) through rewards tracked by the blockchain storage system 112. In some embodiments, a company such as a retailer may incentivize users to participate in the blockchain storage system 112 by providing loyalty rewards, rebates, discounts, additional app functionality, or any other suitable type of reward associated with the retailer as rewards for participating in the blockchain storage system 112.

Once stored in the blockchain storage system 112, the collected data can be used for any suitable purpose. For example, governmental agencies may use the collected data to monitor for violations of environmental regulations. As another example, a health products company may use the collected data in order to determine environmental exposures users experience in various locations, and may suggest health products (such as skin creams or other medications) to counteract the effects of the environmental exposures. As yet another example, users may use the collected data in order to detect when they are venturing into a geographic area in which environmental pollutants have been detected.

The blockchain storage system 112 can provide benefits over traditional storage systems, at least in that no single entity need invest in creating and maintaining the blockchain storage system 112. Also, because the blockchain storage system 112 reliably stores the information in a manner that is unlikely to be corrupted, multiple unrelated consumers of the data may desire to use the single source of data, since the reliability of the data is ensured by the technology and no single entity must shoulder the entire cost of storage.

Figure 2:
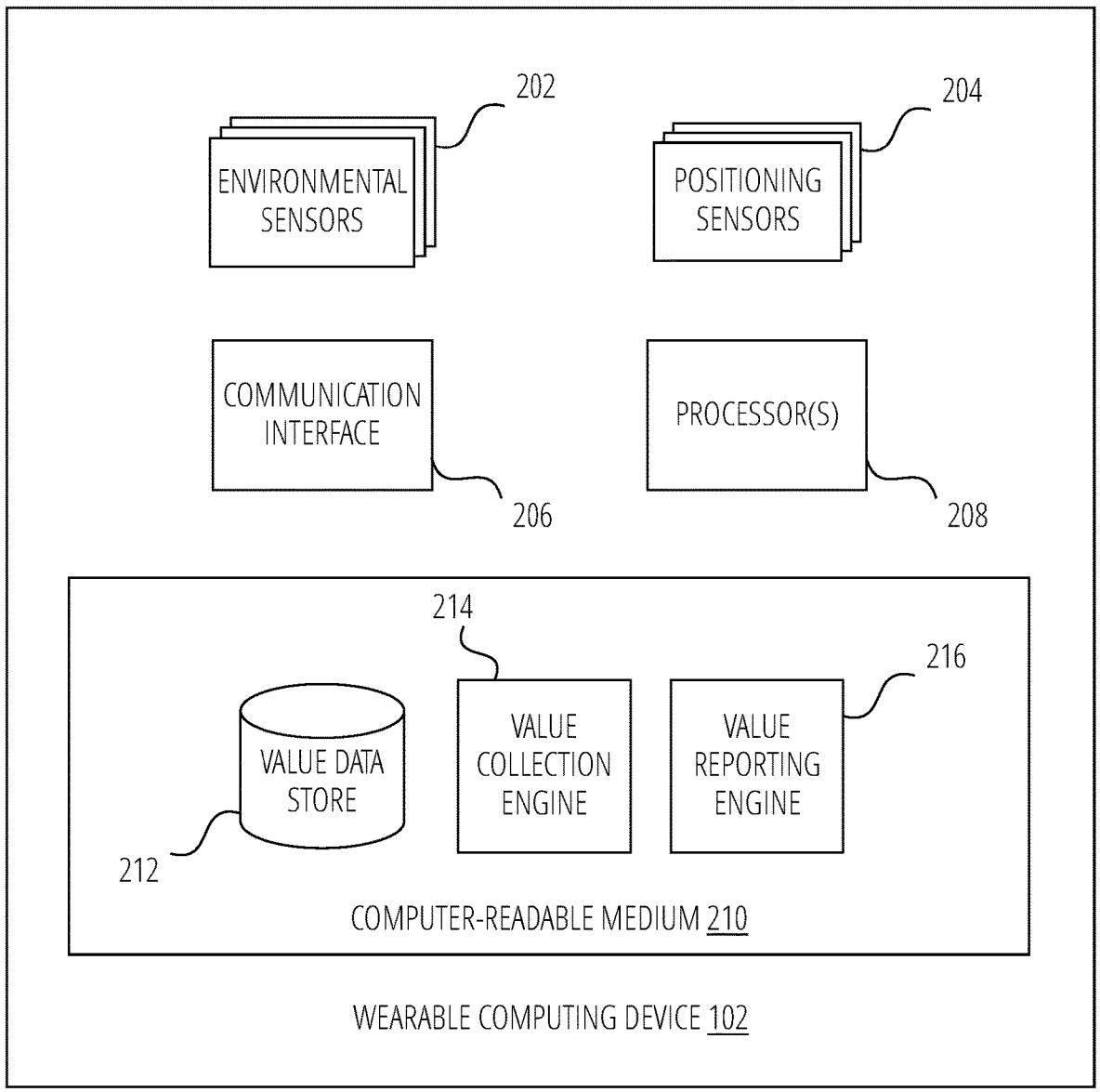
FIG. 2 is a block diagram that illustrates a non-limiting example embodiment of a wearable computing device according to various aspects of the present disclosure.

FIG. 2 is a block diagram that illustrates a non-limiting example embodiment of a wearable computing device according to various aspects of the present disclosure. As mentioned above, the wearable computing device 102 may be a device of any suitable form factor for being carried by a user.

As shown, the wearable computing device 102 includes one or more environmental sensors 202, one or more positioning sensors 204, a communication interface 206, one or more processor(s) 208, and a computer-readable medium 210.

In some embodiments, the environmental sensors 202 may include one or more sensors for sensing environmental conditions 106 near the wearable computing device 102.

Some non-limiting examples of environmental sensors 202 include, but are not limited to, a nitrogen dioxide sensor, a lead sensor, a sulfur dioxide sensor, a particulate matter sensor (including but not limited to a PM2.5 sensor), a UV sensor, a temperature sensor, a humidity sensor, an ambient pressure sensor, a carbon monoxide sensor, a radon sensor, an ozone sensor, a volatile organic component (VOC) sensor, an air quality index (AQI) sensor, an ethanol sensor, a sulfide gas sensor, an indoor air quality (IAQ) sensor, and a hydrogen sulfide ($H_2S$) sensor. In some embodiments, the environmental sensors 202 may be operable at multiple different power consumption levels. In some embodiments, the environmental sensor 202 may be configurable to be deactivated or otherwise placed in a minimal power consumption state when not in use to collect samples.

In some embodiments, the positioning sensors 204 may include one or more sensors for sensing signals from a global navigation satellite system 108, a local positioning system 110, or other positioning systems. The wearable computing device 102 may also include one or more processors configured to analyze the signals received from one or more positioning sensors 204 and translating them into positions. In some embodiments, the wearable computing device 102 may include a processor configured to receive information generated by a positioning sensor located on the communication device 104, and may thereby obtain position information instead of directly from a positioning sensor 204 of the wearable computing device 102. In some embodiments, the positioning sensors 204 may be operable at multiple different power consumption levels. In some embodiments, the positioning sensors 204 may be configurable to be deactivated or otherwise placed in a minimal power consumption state when not in use to collect position information.

In some embodiments, the communication interface 206 may be configured to provide any suitable communication technology for communicating with the communication device 104. Typically, the communication interface 206 may use a technology selected to minimize power consumption, including but not limited to Bluetooth or Bluetooth Low Energy, but this should not be seen as limiting, and any communication technology may be used. In some embodiments, the communication interface 206 may be configured to support multiple communication technologies, such as a wireless communication technology to use while not physically coupled to the communication device 104, and a wired communication technology to use while physically coupled to the communication device 104. In some embodiments, the communication interface 206 may be configurable to operate in either a high-power, high-bandwidth mode or a low-power, low-bandwidth mode. In some embodiments, the communication interface 206 may be configurable to be powered off when not in use.

In some embodiments, the processor(s) 208 may include one or more general purpose processor configured to execute instructions stored on the computer-readable medium 210. In some embodiments, the processor(s) 208 may include one or more ASICs, FPGAs, or other devices with circuitry hard-wired therein to execute logic as described below.

In some embodiments, the computer-readable medium 210 may include one or more devices that provide any type of computer-readable medium suitable for use in the wearable computing device 102. Typically, a computer-readable medium that consumes minimal power, including but not limited to flash memory, may be included in the computer-readable medium 210. However, this should not be seen as limiting, and in some embodiments, the computer-readable medium 210 may include a hard disk drive, an optical drive, RAM, ROM, or a computer-readable medium 210 accessed on another device via the communication interface 206.

As shown, the computer-readable medium 210 includes a value collection engine 214, a value reporting engine 216, and a value data store 212.

In some embodiments, the value collection engine 214 is configured to use the environmental sensors 202 to collect environmental condition values, and to use the positioning sensors 204 to collect position values. In some embodiments, the position values may include a latitude and a longitude. In some embodiments, the position values may also include a radius or another indication of a precision of the position value. In some embodiments, the value collection engine 214 may manipulate the power states of the environmental sensors 202 and the positioning sensors 204 in order to minimize power consumption and thereby maximize battery life for the wearable computing device 102. In some embodiments, the value collection engine 214 stores the environmental condition values and the position values in the value data store 212.

In some embodiments, the value reporting engine 216 is configured to transmit environmental condition values and position values from the value data store 212 to the communication device 104 via the communication interface 206. In some embodiments, the value reporting engine 216 is configured to cryptographically sign the values before transmission to the communication device 104 in order to ensure an unbroken chain of custody of the values from the environmental sensors 202 and the positioning sensors 204 to the blockchain storage system 112. In some embodiments, the value reporting engine 216 is configured to manipulate power states of the communication interface 206 in order to minimize power consumption and thereby maximize battery life of the wearable computing device 102.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store suitable for use with the wearable computing device 102 is data stored in an organized manner on a computer-readable storage medium, such as a flash memory, RAM, ROM, hard drive, or any other type of computer-readable storage medium. One of ordinary skill in the art will recognize that separate data stores described herein may be combined into a single data store, and/or a single data store described herein may be separated into multiple data stores, without departing from the scope of the present disclosure.

It will be understood that the wearable computing device 102 may include other components, including but not limited to one or more internal communication buses, one or more batteries, one or more charging interfaces, one or more displays, and one or more human-computer interaction devices. Because implementation of such devices and the incorporation of such devices into the wearable computing device 102 is within the ability of one of ordinary skill in the art, detailed description of such devices has been omitted for the sake of brevity.

It will further be understood that although FIG. 2 illustrates the wearable computing device 102 as including various components, in some embodiments, the system 100 may rely on devices other than the wearable computing device 102 to provide the illustrated functionality. For example, in some embodiments, the wearable computing device 102 does not include positioning sensors 204. Instead, in such embodiments, the communication device 104 may include one or more positioning sensors, and a position reported by the positioning sensors of the communication device 104 may stand in as a substitute for a position reported by the positioning sensors 204 of the wearable computing device 102. Assuming that the communication interface 206 used to communicate between the wearable computing device 102 and the communication device 104 uses a relatively short-range communication technology (such as Bluetooth or USB), including the positioning sensor in the communication device 104 instead of in the wearable computing device 102 may be a way to further improve battery life of the wearable computing device 102, though the accuracy of the position with respect to the location of the wearable computing device 102 will be somewhat decreased.

Likewise, other functionality described as being provided by the wearable computing device 102, such as functionality of the value collection engine 214 and the value reporting engine 216 related to activating/determining a power level of various components of the wearable computing device 102, may be performed instead by the communication device 104 by executing the related logic on the communication device 104 and sending instructions to the components of the wearable computing device 102 via the communication interface 206.

Figure 3A:
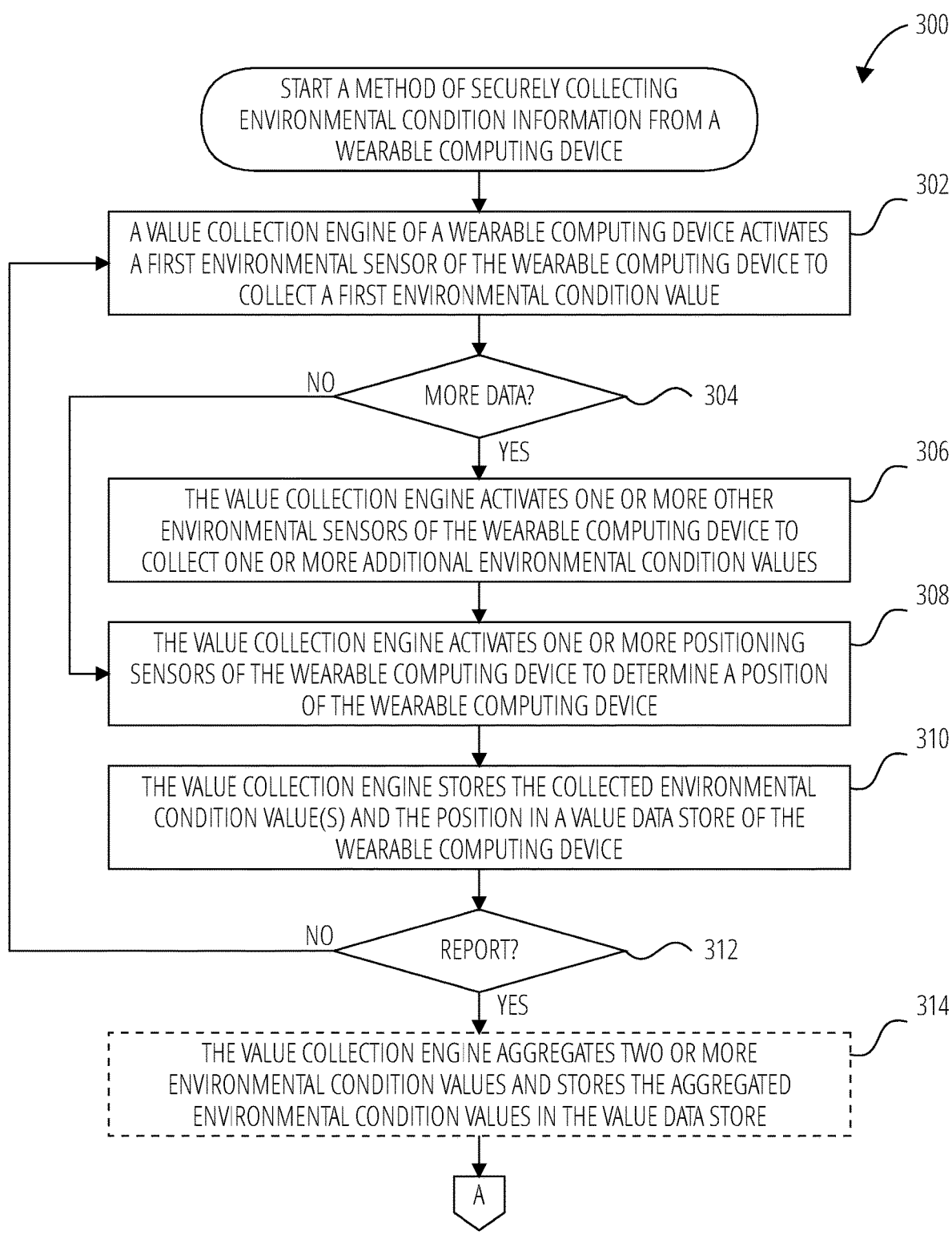
FIG. 3A-FIG. 3B are a flowchart that illustrates a non-limiting example embodiment of a method of securely collecting environmental condition information from a wearable computing device according to various aspects of the present disclosure.
Figure 3B:
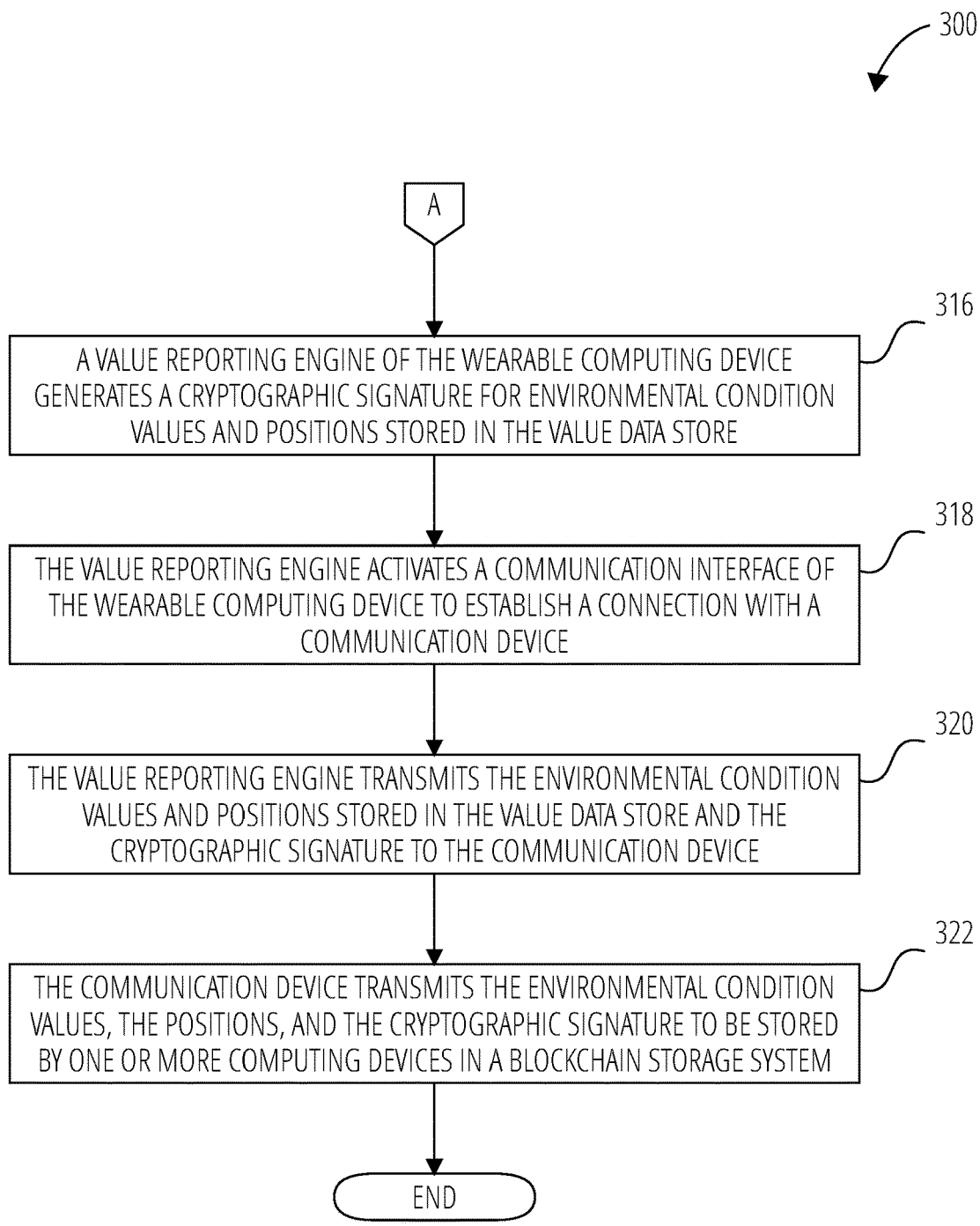

FIG. 3A-FIG. 3B are a flowchart that illustrates a non-limiting example embodiment of a method of securely collecting environmental condition information from a wearable computing device according to various aspects of the present disclosure. In the method 300, a wearable computing device 102 is used to securely collect environmental condition values and transmit them to a blockchain storage system 112 via a communication device 104. In some embodiments, the method 300 includes features that allow for power consumption to be minimized. In some embodiments, the method 300 includes features that allow for verification of the chain of custody of the environmental condition values all the way from the wearable computing device 102 to the blockchain storage system 112, thus ensuring reliability of the stored information.

From a start block, the method 300 proceeds to block 302, where a value collection engine 214 of a wearable computing device 102 activates a first environmental sensor 202 of the wearable computing device 102 to collect a first environmental condition value. In some embodiments, the value collection engine 214 may cause the first environmental sensor 202 to transition from a powered-off state or a low-power state to a powered-on state or a high-power state in order to collect the first environmental condition value. In some embodiments, the value collection engine 214 may cause the first environmental sensor 202 to operate in a low-power mode to get a preliminary environmental condition value that will be used to determine whether a high-power mode should be used thereafter to collect more detailed information.

In some embodiments, other factors may be used to decide whether to activate the first environmental sensor 202. In some embodiments, the value collection engine 214 may selectively activate the first environmental sensor 202 of the wearable computing device 102 based on a contextual scenario. For example, the value collection engine 214 may use a positioning sensor 204 to determine a position of the wearable computing device 102, and may activate the first environmental sensor 202 in response to detecting that the position is associated with a proximity to a known pollution source such as a highway or a shipping port. As another example, the value collection engine 214 may refrain from activating the first environmental sensor 202 in response to detecting that the position is associated with positions of other wearable computing devices 102, such that collecting further information from the position would be redundant. As yet another example, the communication device 104 or the wearable computing device 102 may determine an amount of free space available within the blockchain storage system 112, and may cause the value collection engine 214 to refrain from activating the first environmental sensor 202 in response to determining that there is not adequate free space within the blockchain storage system 112 to store the collected values.

The method 300 proceeds to a decision block 304, where a determination is made regarding whether more data should be collected. In some embodiments, the determination may be based on the first environmental condition value. As one non-limiting example, the low-power state for the first environmental sensor 202 may power up the first environmental sensor 202 for a short amount of time to determine a presence or absence of a substance, wherein the presence of the substance may indicate that the first environmental sensor 202 should be activated for a longer amount of time to obtain a more accurate environmental condition value. As still another non-limiting example, the first environmental condition value obtained from the first environmental sensor 202 may indicate the presence of an environmental condition that suggests that other environmental conditions may also be present, for which other environmental sensors 202 would be used to collect values. For instance, the first environmental condition value may be a UV exposure value that indicates that the wearable computing device 102 is outdoors, thereby indicating that meaningful values could be collected from a particulate matter sensor, a sulfur dioxide sensor, or other environmental sensors 202 for collecting outdoor environmental condition values. Similarly, a UV exposure value may indicate that the wearable computing device 102 is indoors, thereby indicating that meaningful values could be collected from a radon sensor.

If it is determined that more data should be collected, then the result of decision block 304 is YES, and the method 300 proceeds to block 306, where the value collection engine 214 activates one or more other environmental sensors 202 of the wearable computing device 102 to collect one or more additional environmental condition values. As one non-limiting example, the value collection engine 214 may activate the first environmental sensor 202 in a high-power state or for a longer amount of time in order to obtain a more accurate environmental condition value. As another non-limiting example, the value collection engine 214 may activate one or more other environmental sensors 202 to collect additional environmental condition values to accompany the first environmental condition value. The method 300 then proceeds to block 306.

Returning to decision block 304, if it was determined that no more data should be collected based on the first environmental condition value, then the result of decision block 304 is NO, and the method 300 proceeds to block 308.

At block 308, the value collection engine 214 activates one or more positioning sensors 204 of the wearable computing device 102 to determine a position of the wearable computing device 102. In some embodiments, the value collection engine 214 may use the collected environmental condition value(s) to determine which positioning sensors 204 to activate, and/or to determine a power level at which to activate the positioning sensors 204.

As a non-limiting example, if the collected environmental condition value(s) indicate that the wearable computing device 102 is indoors, the value collection engine 214 may activate one or more positioning sensors 204 associated with indoor positioning technologies, whereas if the collected environmental condition value(s) indicate that the wearable computing device 102 is outdoors, the value collection engine 214 may activate one or more positioning sensors 204 associated with outdoor positioning technologies.

As another non-limiting example, a seriousness or a potential area of effect of the collected environmental condition value(s) may determine a power level or an amount of time for which the one or more positioning sensors 204 are activated, in order to determine a position of the wearable computing device 102 with a level of precision that is determined by the seriousness or potential area of effect of the collected environmental condition value(s). For instance, if the collected environmental condition value(s) indicate a presence of lead, it is possible that the lead exposure is related to a point source or other limited area near the wearable computing device 102. Accordingly, such a collected environmental condition value may cause the one or more positioning sensors 204 to be activated in a high-power mode or for a longer period of time in order to determine a precise location at which the lead was detected. Alternatively, if the collected environmental condition value(s) indicate a presence of sulfur dioxide, it is possible that the air in a large area surrounding the wearable computing device 102 would cause similar exposures to sulfur dioxide. Accordingly, such a collected environmental condition value may cause the one or more positioning sensors 204 to be activated in a low-power mode or for a shorter period of time since the precise location of the detected sulfur dioxide exposure is not as important. In some embodiments wherein more than one environmental condition value was collected, the highest power level or longest amount of time suggested by the environmental condition values may be used. In some embodiments, a high-power level may include activating a larger number of positioning sensors 204, while a low-power level may include activating a smaller number of positioning sensors 204.

At block 310, the value collection engine 214 stores the collected environmental condition value(s) and the position in a value data store 212 of the wearable computing device 102. In some embodiments, the value collection engine 214 stores the collected environmental condition value(s) and the position in a single record in the value data store 212. In some embodiments, the value collection engine 214 may generate a hash and/or a cryptographic signature to be stored along with the collected environmental condition value(s) and the position in order to permanently associate the collected environmental condition value(s) to the position and to prevent changes to the values or the position from being made without being detected. In some embodiments, the values are stored along with a timestamp that indicates a date and/or time at which the information was collected. In some embodiments, instead of storing each value with a timestamp, a time series of values is collected with a fixed amount of time between collection of each value, such that only a start or end time for the time series needs to be stored and storage space can be saved.

In some embodiments, the value collection engine 214 may selectively activate the one or more positioning sensors 204 at block 308 in response to determining that additional data should be collected at decision block 304, and may selectively store the information at block 310. In such embodiments, if it is determined at block 308 that additional data should not be collected, the value collection engine 214 may not activate the positioning sensors 204 at block 308, and may not store the values at block 310. The initially collected environmental condition value may be a value that indicates that not only do other values not need to be collected, but that the initially collected value is insignificant enough to throw away. For example, if the initially collected value is the same as a previously collected and stored value, the initially collected value may be discarded and an assumption may be made that the previously collected and stored value continues to reflect the current state until a new value is stored. This can help reduce the amount of data stored in the value data store 212, and can help reduce power consumption by reducing the number of times the positioning sensors 204 are activated.

After block 310, the method 300 proceeds to decision block 312, where a determination is made regarding whether the wearable computing device 102 should report the information stored in the value data store 212. In some embodiments, the wearable computing device 102 may report the information stored in the value data store 212 at substantially fixed time intervals. In some embodiments, the wearable computing device 102 may report the information stored in the value data store 212 once a threshold amount of information stored in the value data store 212 has been reached. In some embodiments, the wearable computing device 102 may report the information stored in the value data store 212 when it is determined that a particular environmental condition value has been detected, including but not limited to an environmental condition value for a particular environmental condition that reaches a predetermined threshold value. In some embodiments, the wearable computing device 102 may report the information stored in the value data store 212 in response to an instruction received from the communication device 104 to report the information.

If it is determined that the information should not yet be reported, then the result of decision block 312 is NO, and the method 300 returns to block 302 to collect additional information. Otherwise, if it is determined that the information should now be reported, then the result of decision block 312 is YES, and the method 300 advances to optional block 314.

At optional block 314, the value collection engine 214 aggregates two or more environmental condition values and stores the aggregated environmental condition values in the value data store 212. In some embodiments, the value collection engine 214 may aggregate the two or more environmental condition values by determining a time period during which the two or more environmental condition values were collected, adding the two or more environmental condition values, and then reporting the sum of the two or more environmental condition values as a total value for the time period. In some embodiments, the value collection engine 214 may only aggregate the two or more environmental condition values so long as the associated positions are within a predetermined distance of each other.

In some embodiments, the value collection engine 214 may perform further or other processing, including but not limited to determining an average rate of exposure over the time period, and reporting the average rate of exposure instead of the total value. In some embodiments, the value collection engine 214 may also generate hashes and/or cryptographic signatures for the aggregated environmental condition values to ensure their validity and the chain-of-custody for the information. The actions of optional block 314 are described as optional because in some embodiments, every environmental condition value is saved separately in the value data store 212 to obtain the highest possible resolution for the data.

The method 300 then proceeds to a continuation terminal ("terminal A"). From terminal A (FIG. 3B), the method 300 proceeds to block 316, where a value reporting engine 216 of the wearable computing device 102 generates a cryptographic signature for environmental condition values and positions stored in the value data store 212. Any suitable cryptographic signature technique may be used, including but not limited to using a signing certificate associated with the wearable computing device 102 to generate the cryptographic signature.

In some embodiments, the cryptographic signature is applied to all of the environmental condition values and positions to be reported as a group, so that removal or addition of environmental condition values and/or positions may be detected. In some embodiments, the cryptographic signature may also be applied to the separate cryptographic signatures for each separately stored environmental condition value and position. In some embodiments, the value reporting engine 216 may not apply cryptographic signatures to the environmental condition values and positions, instead allowing the communication device 104 to apply any such signatures before transmission for storage in the blockchain storage system 112.

At block 318, the value reporting engine 216 activates a communication interface 206 of the wearable computing device 102 to establish a connection with a communication device 104. In some embodiments, the value reporting engine 216 may change a power state of the communication interface 206 from a low-power or powered-off state to a high-power or powered-on state in order to establish the connection with the communication device 104. In some embodiments, the value reporting engine 216 may activate the communication interface 206 at block 318 in response to receiving a wake-up signal from the communication device 104.

At block 320, the value reporting engine 216 transmits the environmental condition values and positions stored in the value data store 212 and the cryptographic signature (if generated) to the communication device 104. In some embodiments, the value reporting engine 216 applies a layer of encryption, using a technique including but not limited to AES, to the transmission of the information from the value data store 212 in order to improve the privacy and security of the transmission between the wearable computing device 102 and the communication device 104. After transmission of the information from the value data store 212, the value reporting engine 216 may power off the communication interface 206 or return the communication interface 206 to a low-power mode, and may delete the information from the value data store 212 or otherwise mark it as available to be overwritten.

At block 322, the communication device 104 transmits the environmental condition values, the positions, and the cryptographic signature to be stored by one or more computing devices in a blockchain storage system 112. The communication device 104 may use any suitable technique for transmitting the information for storage in the blockchain storage system 112. Depending on the type of blockchain storage system 112, the communication device 104 may store the information in the blockchain storage system 112 using a proof-of-work transaction, a proof-of-stake transaction, a proof-of-authority transaction, a proof-of-space transaction, or any other appropriate type of transaction. In some embodiments, the communication device 104 may transmit the information to a broker that will add the information to the blockchain storage system 112. In some embodiments wherein the blockchain storage system 112 uses sharding to create more manageable portions of its data, the communication device 104 may determine an appropriate shard for storage of the information using any suitable technique, including but not limited to determining a shard associated with the location of the wearable computing device 102 or communication device 104.

In some embodiments, the communication device 104 may perform additional operations on the environmental condition values and the positions to prepare them for storage in the blockchain storage system 112. In some embodiments, if the environmental condition values and positions received by the communication device 104 from the wearable computing device 102 do not already include the cryptographic signature, the communication device 104 may generate the cryptographic signature to identify the communication device 104 as the source of the information (as opposed to the wearable computing device 102). In some embodiments, the communication device 104 may determine an amount of free storage space available within the blockchain storage system 112, and may perform further aggregation on the environmental condition values if the amount of free storage space is less than a threshold amount. This may be particularly applicable if the blockchain storage system 112 has divided its blockchain into shards with limited space, and/or if the blockchain storage system 112 is using relatively low-powered computing devices (such as the communication device 104) for processing and storage. In some embodiments, the degree of aggregation of the environmental condition values may be based on the amount of free storage space. For example, if there is less free storage space available, then more environmental condition values will be aggregated in order to consume less storage space.

In some embodiments, the communication device 104 may transmit additional information along with the environmental condition values and the positions to e stored in the blockchain storage system 112. For example, in some embodiments, the communication device 104 may receive information about a profile of a user of the wearable computing device 102, including but not limited to one or more of an age, a skin type, health products being used by the user, and a medical history of the user, and may store the profile information in the blockchain storage system 112 along with the environmental condition values and the positions. In some embodiments, the communication device 104 may store the information in the blockchain storage system 112 along with an identifier associated with the user. In some embodiments, the communication device 104 may store the information in the blockchain storage system 112 in an anonymized manner, such that the privacy of the user may be preserved. Anonymized storage of the information in the blockchain storage system 112 may be desired, particularly if access to the blockchain storage system 112 is considered public.

The method 300 then proceeds to an end block and terminates. Though illustrated as terminating for ease of discussion, in some embodiments, the method 300 may instead loop back to block 302 in order to collect more information.

Figure 4:
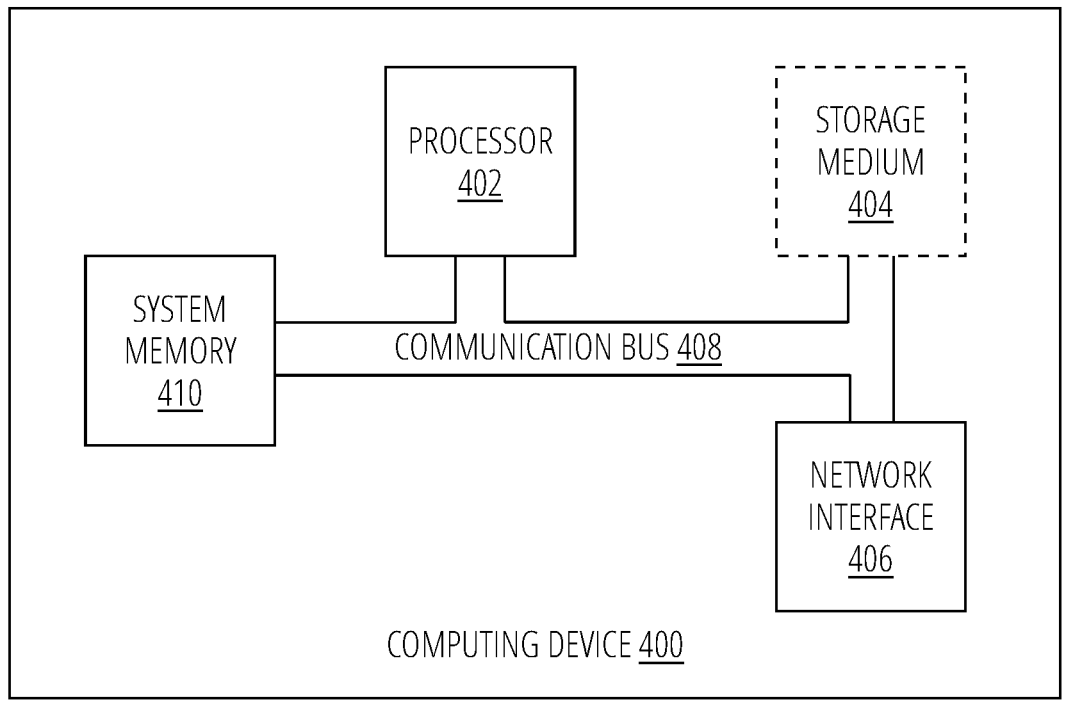
FIG. 4 is a block diagram that illustrates a non-limiting example embodiment of a computing device appropriate for use as a computing device with embodiments of the present disclosure.

FIG. 4 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 400 may be any one of any number of currently available or yet to be developed devices.

In its most basic configuration, the computing device 400 includes at least one processor 402 and a system memory 410 connected by a communication bus 408. Depending on the exact configuration and type of device, the system memory 410 may be volatile or nonvolatile memory, such as read only memory ("ROM"), random access memory ("RAM"), EEPROM, flash memory, or similar memory technology. Those of ordinary skill in the art and others will recognize that system memory 410 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 406 comprising one or more components for communicating with other devices over a network. Embodiments of the present disclosure may access basic services that utilize the network interface 406 to perform communications using common network protocols. The network interface 406 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 406 illustrated in FIG. 4 may represent one or more wireless interfaces or physical communication interfaces described and illustrated above with respect to particular components of the computing device 400.

In the exemplary embodiment depicted in FIG. 4, the computing device 400 also includes a storage medium 404. However, services may be accessed using a computing device that does not include means for persisting data to a local storage medium. Therefore, the storage medium 404 depicted in FIG. 4 is represented with a dashed line to indicate that the storage medium 404 is optional. In any event, the storage medium 404 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 402, system memory 410, communication bus 408, storage medium 404, and network interface 406 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

What is claimed is:

1. A wearable computing device, comprising:
  one or more environmental sensors;
  one or more positioning sensors; and
  a communication interface;
  wherein the wearable computing device is configured to:
    activate at least one environmental sensor of the one or more environmental sensors to obtain at least one environmental condition value;
    determine whether the at least one environmental condition value meets a predetermined threshold;
    in response to determining that the at least one environmental condition value meets the predetermined threshold, activate at least one additional environmental sensor of the one or more environmental sensors to obtain at least one additional environmental condition value;
    in response to determining that the at least one environmental condition value fails to meet the predetermined threshold, refraining from activating the at least one additional environmental sensor, thereby conserving power;
    activate at least one positioning sensor of the one or more positioning sensors to determine a position of the wearable computing device;
    activate the communication interface; and
    transmit at least the at least one environmental condition value and the position for storage in a blockchain storage system.

2. The wearable computing device of claim 1, wherein the wearable computing device is further configured to:
  activate the at least one environmental sensor to obtain at least one second environmental condition value after a time period that is based on the at least one environmental condition value.

3. The wearable computing device of claim 1, wherein the wearable computing device is further configured to:

generate a cryptographic signature for the at least one environmental condition value and the position using a certificate associated with the wearable computing device.

4. The wearable computing device of claim 1, wherein the wearable computing device is further configured to:
generate an aggregated environmental condition value based on a plurality of environmental condition values obtained between a start time and an end time; and
transmit the aggregated environmental condition value for storage in the blockchain storage system.

5. The wearable computing device of claim 4, wherein each environmental condition value of the plurality of environmental condition values is associated with a position that is within a predetermined distance of positions associated with the other environmental condition values in the plurality of environmental condition values.

6. The wearable computing device of claim 1, wherein the one or more environmental sensors include one or more of a nitrogen dioxide sensor, a lead sensor, a sulfur dioxide sensor, a particulate matter sensor, a UV sensor, a temperature sensor, a humidity sensor, an ambient pressure sensor, a carbon monoxide sensor, a radon sensor, an ozone sensor, a volatile organic component (VOC) sensor, an air quality index (AQI) sensor, an ethanol sensor, a sulfide gas sensor, an indoor air quality (IAQ) sensor, and a hydrogen sulfide (H2S) sensor.

7. A system, comprising:
a blockchain storage system that includes a plurality of computing devices configured to collectively store information;
a communication device; and
a wearable computing device that includes:
at least one processor;
at least one environmental sensor;
at least one positioning sensor; and
a computer-readable medium having computer-executable instructions stored thereon that, in response to execution by the at least one processor, cause the wearable computing device to perform actions comprising:
generating an aggregated environmental condition value by:
activating a first environmental sensor of the at least one environmental sensor to obtain a plurality of environmental condition values between a start time and an end time;
activating the at least one positioning sensor to determine a position of the wearable computing device for each environmental condition value of the plurality of environmental condition values; and
updating the aggregated environmental condition value using environmental condition values of the plurality of environmental condition values that are associated with positions that are within a predetermined distance of other positions of other environmental condition values of the plurality of environmental condition values; and
transmitting the aggregated environmental condition value and at least one position to the communication device instead of transmitting the plurality of environmental condition values for storage in the blockchain storage system.

8. The system of claim 7, wherein the at least one environmental sensor includes one or more of a nitrogen dioxide sensor, a lead sensor, a sulfur dioxide sensor, a particulate matter sensor, a UV sensor, a temperature sensor, a humidity sensor, an ambient pressure sensor, a carbon monoxide sensor, a radon sensor, an ozone sensor, a volatile organic component (VOC) sensor, an air quality index (AQI) sensor, an ethanol sensor, a sulfide gas sensor, an indoor air quality (IAQ) sensor, and a hydrogen sulfide (H2S) sensor.

9. The system of claim 7, wherein the at least one positioning sensor includes at least one of a global navigation satellite system sensor and a local positioning system sensor.

10. The system of claim 7, wherein the communication device is part of the plurality of computing devices of the blockchain storage system.

11. The system of claim 7, wherein the blockchain storage system is configured to store information using a proof-of-work technique, a proof-of-authority technique, a proof-of-stake technique, or a proof-of-space technique.

12. The system of claim 7, wherein the communication device is configured to determine an amount of free space available in the blockchain storage system;
wherein the start time and the end time are based on the amount of free space available in the blockchain storage system.

13. A wearable computing device, comprising:
circuitry for activating at least one environmental sensor of the wearable computing device to obtain at least one environmental condition value;
circuitry for activating at least one positioning sensor of the wearable computing device in a first power consumption mode to determine a position of the wearable computing device with a first level of accuracy in response to determining that the at least one environmental condition value meets a predetermined threshold;
circuitry for activating the at least one positioning sensor of the wearable computing device in a second power consumption mode to determine the position of the wearable computing device with a second level of accuracy in response to determining that the at least one environmental condition value does not meet the predetermined threshold;
circuitry for activating a communication interface of the wearable computing device; and
circuitry for transmitting the at least one environmental condition value and the position for storage in a blockchain storage system;
wherein the first level of accuracy is less accurate than the second level of accuracy; and
wherein the first power consumption mode consumes less power than the second power consumption mode, thereby conserving power when the at least one environmental condition value meets the predetermined threshold.

14. The wearable computing device of claim 13, further comprising circuitry for activating the at least one environmental sensor to obtain at least one second environmental condition value after a time period has elapsed that is based on the at least one environmental condition value.

15. The wearable computing device of claim 13, further comprising circuitry for activating at least one additional environmental sensor of the wearable computing device to obtain at least one additional environmental condition value based on the at least one environmental condition value.

16. The wearable computing device of claim 13, further comprising circuitry for generating a cryptographic signature for the at least one environmental condition value and the position using a certificate associated with the wearable computing device.

17. The wearable computing device of claim 13, further comprising:
    circuitry for generating an aggregated environmental condition value based on a plurality of environmental condition values obtained between a start time and an end time; and
    circuitry for transmitting the aggregated environmental condition value for storage in the blockchain storage system.

18. The wearable computing device of claim 17, wherein each environmental condition value of the plurality of environmental condition values is associated with a position that is within a predetermined distance of positions associated with the other environmental condition values in the plurality of environmental condition values.

\* \* \* \* \*